Dec. 14, 1937. J. H. FLETCHER 2,101,901
GLARE SHIELD
Filed Sept. 26, 1936
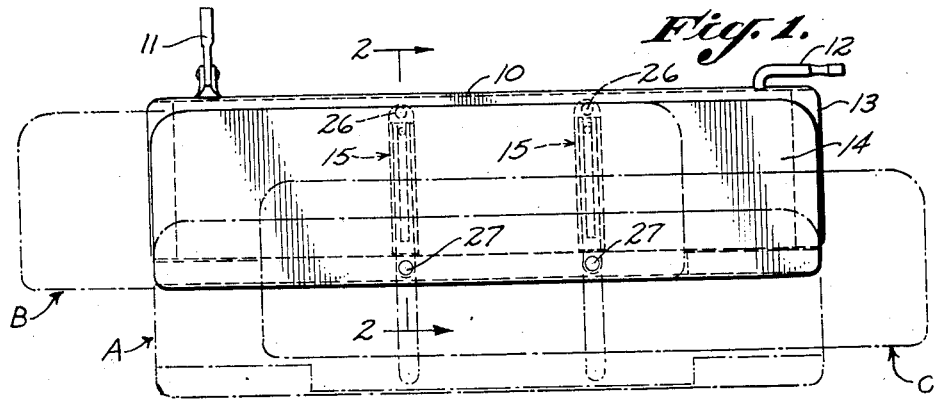
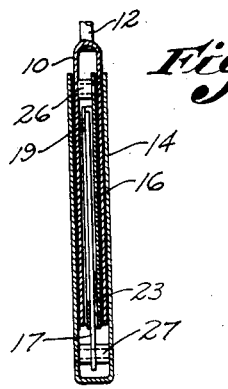
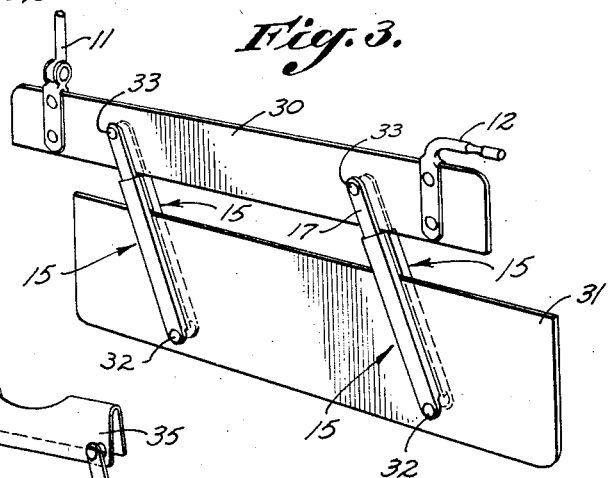
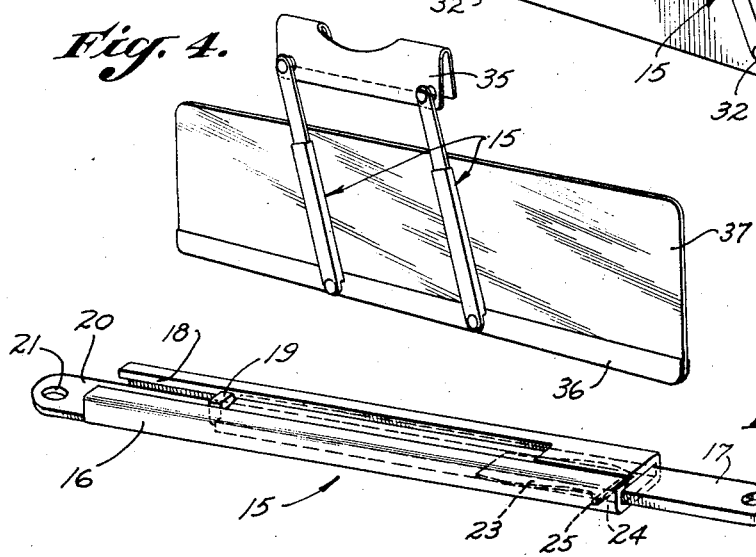
INVENTOR.
Joseph H. Fletcher
BY Russell M. Otis
ATTORNEY.

Patented Dec. 14, 1937

2,101,901

UNITED STATES PATENT OFFICE 2,101,901

GLARE SHIELD

Joseph H. Fletcher, Southgate, Calif.

Application September 26, 1936, Serial No. 102,776

7 Claims. (Cl. 296—97)

My invention relates to a glare shield which has particular application in automobiles to shield the eyes of the passengers from the direct light of the sun during those hours of the day in which the sun is near the horizon and also from the direct light of approaching automobiles at night.

Glare shields designed for this general purpose are now employed on automobiles and are commonly so mounted that they lie against the roof of the car when not in use and are folded down when they are desired to be used. Some mountings also permit the shield to be swung around to the side so that it shields the passenger's eyes from light coming in through the side window. These shields are a great convenience, but oftentimes it is not possible to position them to intercept the objectionable light simply because the shields are not large enough or are limited in their travel. To make the shield larger, however, would be to make it unsightly and an obstacle when not in use.

It is an object, therefore, of my invention to provide a glare shield which is extensible downwardly and to either side in order to permit it, while in use, to cover a relatively large area and to be compacted into a small space while not in use.

Another object of the invention is to provide a glare shield in which the relatively movable shield element is restrained from being tilted out of the plane of its companion shield portion.

Another object of the invention is to provide an extensible glare shield in which the parts will remain in the relative position to which they are moved until they are again deliberately readjusted.

I attain these objects in a manner which will be clear from a consideration of the following description taken in connection with the accompanying drawing, of which:

Fig. 1 is an elevational view of one form of my glare shield with some of the possible positions of the movable extending portion being shown in dotted lines.

Fig. 2 is a sectional view of the glare shield of Fig. 1 taken along the line 2—2.

Fig. 3 is a perspective view of an alternative form of my glare shield.

Fig. 4 is a perspective view of an alternative form of my glare shield.

Fig. 5 is an enlarged perspective view of the link employed to connect the two relatively movable portions of my glare shield.

In the glare shield of my invention I provide two relatively movable portions connected by extensible links. In the form illustrated in Figs. 1 and 2, one shield element 10 acts as a support member and is provided with fixtures 11 and 12 which are employed in mounting the glare shield on an automobile in a well-known manner so that the shield may be rotated down in front of the passenger's eyes or can be turned to the side to cover a portion of the side window. The element 10 is hollow over most of its extent, being only closed at the top and at the ends. It is most conveniently constructed by bending a metal sheet into the form of a narrow inverted U and closing the ends, as at 13, with blocks of wood.

Fitting over the shield element 10, and frictionally contacting the sides thereof, is another U shaped shield element 14 which is closed only at the bottom. It will thus be seen that the element 14 can move in the common plane of elements 10 and 14 both up and down and to either side, but cannot be tilted out of the common plane of the two elements.

The shield elements 10 and 14 are connected by two extensible links 15 which are identical, and which are movable within the element 10, one end of each link 15 being rotatably connected to the top of element 10 and the other end of each link being rotatably connected to the bottom of element 14.

The links 15 are shown in detail in Fig. 5. They are preferably made in the form illustrated in order to accomplish the following objects. The links must be thin in order to permit of placing them within the narrow hollow shield element 10. They must be extensible and continuously adjustable in length to the limit of their extension, while at the same time being capable of retaining a given adjustment until deliberately readjusted. The preferred form of link 15 comprises, as one part, the member 16 preferably made by wrapping a piece of sheet metal into an elongated rectangular shape providing a shallow rectangular passage therethrough. In this passage slides a strip 17 of rectangular cross-section. The member 16 has a slot 18 in one face extending from one end thereof to near the other end, in which slot rides an upwardly bent projection 19 on the strip 17. The face of member 16 opposite to the slotted face terminates at one end in a tab 20 projecting out beyond the remainder of the member and which is provided with a hole 21 therethrough. The end of strip 17 opposite to the projection 19 also has a hole 22 therethrough.

In order to insure that strip 17 is held in member 16 in any position in which it is placed in such a way that vibration, etc. will not cause a change in the relative position of the two members, I provide between them an arched spring 23 which is retained in member 16 and bears frictionally on the strip 17. The spring 23 consists of a strip of spring metal such as phosphor bronze or spring steel which is arched upwardly and which is at one end 24 bent sharply downwardly to form a small projection. The spring 23 is retained against longitudinal movement by the projection at 24 which seats in a shallow channel-like depression 25 in the inner lower face of member 16.

By reason of this construction the members 16 and 17 are continuously adjustable in position relative to one another between the position in which they substantially coincide and that in which the projection 19 abuts against the closed end of the slot 18; and at any intermediate position the two members are tightly held against everything but a deliberate attempt at readjustment.

In the form of glare shield shown in Figs. 1 and 2 the links 15 are suspended in the element 10 on rivets 26 which pass through holes 21 in the members 16. Over the rivets 26 and lying between tab 20 and the element 10 are spacing washers which may include one or more spring washers. The other ends of links 15 are pivotally connected to the element 14 by rivets 27 which pass through holes 22 in strips 17. On the rivets 27 and lying between the strip 17 and element 14 are spacing washers which may also include spring washers.

By virtue of this construction, the lower shield element 14 may be made to coincide substantially with the element 10 as shown in solid lines, or it may be moved downwardly relative to shield element 10 to the full extent of the extensible links 15 as shown by dotted lines in position A. It may be moved to either side as shown by dotted lines in positions B and C or be tipped so that one end is lower than the other. In any position the links 15 will remain of a fixed length until the shield is deliberately readjusted. The friction of the contacting surfaces of U shaped elements 10 and 14 may be depended upon to prevent element 14 from rotating to the lowermost position due to vibration.

In Fig. 3 is illustrated another form of my glare shield. Here I provide a relatively narrow shield element 30 to which are attached the usual mounting fixtures 11 and 12, and a broader shield element 31 which is movable relative to element 30 by reason of its connection thereto by extensible links 15. In this form of the invention, as contrasted to the form of Fig. 1, when the lower shield element 31 is pulled downward a space is left between the two shield elements and there is no direct contact between them. In order to prevent tilting of the shield element 31 out of the common plane of elements 30 and 31 and to strengthen the structure I employ two pairs of links 15 one pair on each side of the shield. The links 15 are identical to those previously described as employed on the shield shown in Fig. 1. I have shown the members 16 pivotally connected to shield element 31 by rivets 32 which pass through both of the members 16 and through element 31. In a similar manner strips 17 are pivotally connected to the upper shield element, or support, 30 by rivets 33. On the rivets 32 and 33 and lying between the link members and the shield elements are spacing washers of which some may be spring washers. The rivets 32 and 33 clamp the links tightly so as to prevent rotation of the lower shield element due to vibration. It will be observed that the lower element 31 of this glare shield is capable of the same movements relative to its upper companion element as is the lower element of the form previously described.

Another form of my glare shield is illustrated in Fig. 4. This form is intended to be mounted on an ordinary non-extensible glare shield such as is commonly employed in automobiles. To that end I provide a spring clip 35 which is adapted to be forced down over the upper edge of the ordinary shield and to be frictionally retained thereon. To one of the lower edges of the support clip 35 are pivotally connected a pair of extensible links 15 of the same type as those previously described. Pivotally connected to the lower ends of the links 15 is the U-shaped metal member 36 in which is clamped the shield 37 which may be either opaque or of transparent colored celluloid. The links 15 are pivotally connected to the member 36 and to clip 35 by rivets on which, and between links 15 and the connected members, are spacing washers which may include spring washers to prevent the links 15 from rotating due to vibration. If, however, the rivets are made tight the spring washers are not necessary. When not in use, this form of glare shield lies flat along, and generally coincides with, the shield on which it is mounted. When it is not possible to adjust the ordinary shield so that it intercepts the objectionable light rays, the glare shield shown in Fig. 4 is pulled down below the other to form an extension thereof. Or it may be moved to either side of the permanently mounted shield or tipped at an angle thereto. This shield, it will be obvious, is capable of all the movements of those previously described.

It will be understood that various modifications in design and construction of my glare shield may be made without departing from the spirit of the invention as defined in the appended claims.

I claim:

1. A glare shield comprising a hollow shield element, a pair of extensible links pivotally connected to said shield element and movable therein, and a second U shaped shield element pivotally connected to the other ends of said links and fitting over said first-mentioned shield element.

2. A glare shield comprising a hollow shield element, a pair of extensible links pivotally connected to said shield element and movable therein, and a second U shaped shield element fitting over and frictionaly contacting the sides of said hollow shield element and being pivotally connected to the other ends of said links, said links being continuously adjustable to the limit of their extension.

3. A glare shield comprising a shield element having provision for mounting said shield, two pairs of extensible links pivotally connected to said shield element, one pair on each side thereof, and a second shield element in the same plane as the first and having pivotally connected thereto on each side thereof the other ends of one pair of said links.

4. In a glare shield including a support element and a relatively movable shield element, an extensible link pivotally connected at opposite ends to said elements and comprising, a member having a passage therethrough, a second member slidable in said passage, a spring in said first member fixed against longitudinal movement and bearing on said second member to frictionally retain it in position, and means limiting the separation of said members.

5. In a glare shield including a support element and a relatively movable shield element, an extensible link pivotally connected at opposite ends to said elements and comprising, an elongated rectangularly-shaped member providing a shallow rectangular passage therethrough, a second member slidable in said passage, an arched resilient metal strip between said members and bearing frictionally on said second member, said resilient strip having one end bent sharply toward and resting in a depression in said first member, a slot in and extending part way along one face of said first member, and a projection on said second member extending into said slot.

6. A glare shield comprising a support adapted for mounting the same, a pair of extensible links pivotally connected to said support, and a shield element pivotally connected to the other ends of said links, said links each comprising an elongated rectangularly-shaped member providing a shallow rectangular passage therethrough, a second member slidable in said passage, an arched resilient metal strip between said members and bearing frictionally on said second member, said resilient strip having one end bent sharply toward and resting in a depression in said first member, a slot in and extending part way along one face of said first member, and a projection on said second member extending into said slot.

7. A glare shield comprising a hollow shield element, a pair of extensible links enclosed in said shield elements and pivotally connected thereto, and a second U shaped shield element fitting over said first-mentioned shield element and pivotally connected to the other ends of said links, said links each consisting of an elongated rectangular-shaped member providing a shallow rectangular passage therethrough, a second member slidable in said passage, an arched resilient metal strip between said members and bearing frictionally on said second member, said resilient strip having one end bent sharply toward and resting in a depression in said first member, a slot in and extending part way along one face of said first member, and a projection on said second member extending into said slot.

JOSEPH H. FLETCHER.